Feb. 13, 1962 W. ZIFFER 3,020,606
SEALING STRIP ASSEMBLY
Filed Nov. 16, 1959
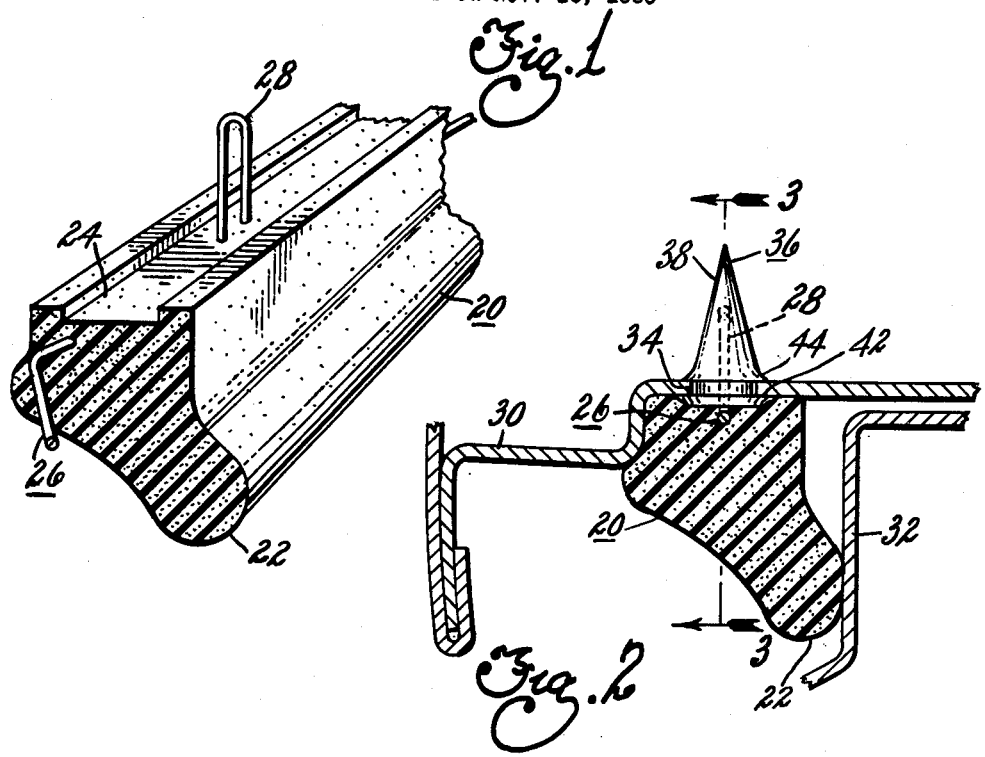
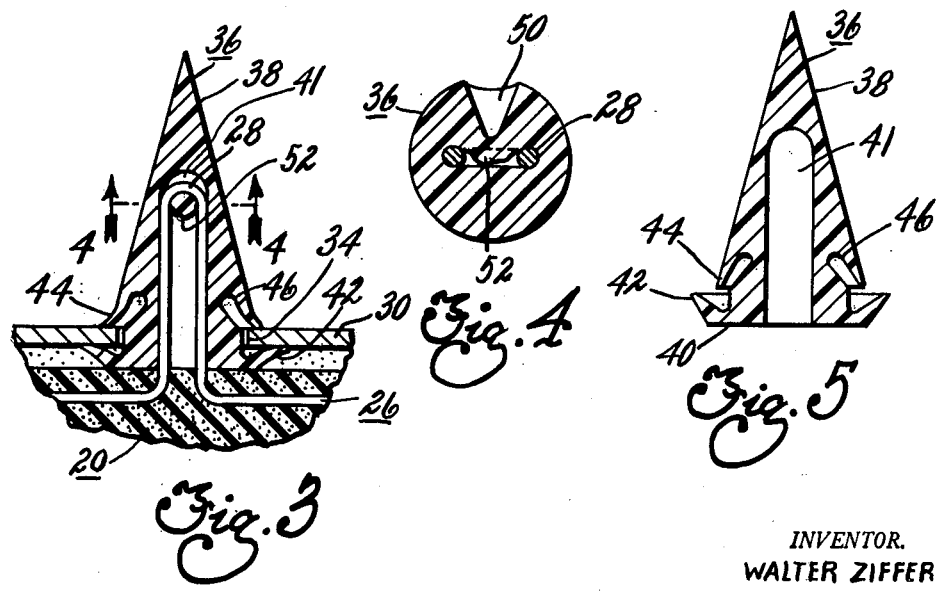
INVENTOR.
WALTER ZIFFER
BY
HIS ATTORNEY

United States Patent Office 3,020,606
Patented Feb. 13, 1962

3,020,606
SEALING STRIP ASSEMBLY
Walter Ziffer, Dayton, Ohio, assignor to General Motors Corporation, Detroit, Mich., a corporation of Delaware
Filed Nov. 16, 1959, Ser. No. 853,190
2 Claims. (Cl. 20—69)

This invention relates to sealing strip assemblies and is particularly concerned with means for preventing leakage of water around sealing strips using wire clip connectors when said strips are mounted on automotive doors and the like.

Sealing strips have long been used around the periphery of automotive doors to engage the body when the door is closed and seal the door thereto whereby the interior of the body may be heated or cooled without the ingress of the external atmosphere and without the egress of the interior air. Furthermore, these sealing strips prevent leakage of rain, etc., around the doors and into the body and also prevent drafts and the like.

Automotive doors are hollow sheet metal structures upholstered at the internal surface thereof and these doors, due to the window which is slidably carried by the upper portion thereof, are frequently wet internally thereof by rain which drives in around the channels that carry the window and leaks to the interior of the door assembly. In order to eliminate this water and prevent it from filling the internal portions of the door, drains and valving means are provided at the lower edge of the door whereby the water drains out and is eliminated.

In recent years, sealing strips have been applied to the doors through a plurality of spring clips which snap into apertures around the periphery of the door frame and such sealing strips are clearly disclosed in Harris Patent 2,579,072. The use of apertures in the door metal as a means for attaching the strips has presented a problem in that the water which drains into the interior of the door may possibly leak outwardly therefrom through the apertures which are used to engage the strip to the lower portions of the door. This permits water to seep outwardly into contact with the upholstery on the door and sometimes onto the rug which covers the floor of the automotive vehicle. The sealing strips that are used around the doors are made from spongy elastomeric material and, if the skin or covering on the sealing strip is ruptured adjacent the clips, it is possible for the strip to absorb moisture which is undesirable, for in freezing weather, solidification of the water within the spongy structure of the sealing strip will, in many instances, injure the strip and, in all instances, will make the sealing thereof imperfect.

In the past, therefore, it has been the practice to use a caulking or sealing compound around the apertures at the lower interior portions of the door whereby these apertures are sealed. While this procedure eliminates the water leakage difficulties, it is costly and likewise, if the strip is removed from the door for any purposes and then replaced, it is difficult to reseal the apertures with sealing compound when the upholstery is in place.

The present invention is directed to a means for sealing these apertures which is less expensive than caulking and which is more convenient to use.

It is, therefore, an object of the invention to provide a means for sealing the apertures in automotive doors utilizing sealing strips having metal attachment points.

In carrying out the above object, it is a further object to provide elastomeric caps for the wire attachment points which caps may be forced through the apertures to seal the apertures. In this connection, the caps may be releasably associated with the door and receive the attachment means of the strip or the caps may be permanently associated with the strip and removably engaged with the door as desired.

In carrying out the above object, it is another object, in some cases, to heat seal the cap to the attachment means so that it is permanently attached thereto.

Further objects and advantages of the present invention will be apparent from the following description, reference being had to the accompanying drawings wherein preferred embodiments of the present invention are clearly shown.

In the drawings:

FIGURE 1 is a fragmentary view in perspective and partly in section of a sealing strip.

FIGURE 2 is a fragmentary sectional view of the lower portion of an automotive door and frame showing the sealing strip in place thereon.

FIGURE 3 is an enlarged sectional view taken on line 3—3 of FIGURE 2.

FIGURE 4 is a sectional view taken on line 4—4 of FIGURE 3.

FIGURE 5 is an enlarged sectional view of one of the caps.

Referring specifically to FIGURE 1, an enlarged sectional view of a portion of a sealing strip 20 is shown which includes a sealing lip 22 extending longitudinally therealong and a channeled base section 24. Within the strip there is molded an extensible wire reinforcement 26 which is preferably of zig-zag character so that the reinforcement 26 may be extended within limits to aid in applying the strip. At predetermined spaced distances along the wire 26, loops or attachment means 28 are provided. These, of course, are integral with the wire and, when the wire 26 is molded within the strip 20, the loops 28 extend outwardly from the base portion 24 of the strip as shown. These loops 28 are the attachment means by which the strip may be releasably attached to a door panel or other supporting structure with which it is used.

A strip of this general character is described and claimed in detail in the aforementioned U.S. Patent 2,579,072. The character of the zig-zag wire and its usefulness together with the outwardly extending clips or attachment points are all discussed in detail and this forms no part of the invention claimed here. The only difference between the two strips is in the attachment points 28 which I prefer to make without an interlock whereby the two sides of the looped wire are substantially parallel.

The sealing strip 20, when applied to an automotive door, is shown in FIGURE 2 wherein the lower section of the door is located at 30 while the door frame is indicated at 32. It will be seen that the sealing strip 20 fits and seals against the door and, when the door is closed as shown in FIGURE 2, the lip 22 of the strip abuts the frame 32 to seal the door against the frame.

In order to attach the strip 20 to the door 30, a plurality of apertures 34 are provided in the door frame through which a plurality of sealing devices or caps 36 are inserted. The caps 36, to be discussed in detail hereinafter, receive the looped attachment points 28 to hold the strip to the door and to simultaneously seal the apertures in the door. One cap is provided for each aperture at the lower portion of the door and may be provided completely around the door if desired.

One of the caps 36 is shown in detail in FIGURE 5 and includes a generally conical upper portion 38 with an enlarged base portion 40 together with a blind bore 41 extending upwardly into the conical portion of the cap. The base 40 includes an upwardly and outwardly extending annular flange 42 therearound which surrounds the bore 41. This flange is relatively thin and, therefore, considerably more flexible than the remainder of the cap 36. A second flange 44 is provided at the base of the conical section and this flange is formed by means of an undercut 46 extending upwardly and inwardly from the base of the conical section. It is apparent that, when the cap 36 is applied to a panel or frame 30 as shown in FIGURE 3, there two relatively thin flange portions 42 and 44 will deflect away from one another and form a pressure seal at opposite sides of the panel. It will be noted that the lips of the flanges 42 and 44 are spaced apart an annular distance less than the thickness of the metal 30 so that, when the cap is pressed through the aperture 34 in the panel, the two flanges snap outwardly and actually seal the cap very effectively to the panel 30.

In practice, the caps may be applied to the panel prior to the application of the sealing strip which can later be applied by merely pressing the loops 28 into the blind bores 41. It is apparent that the width of the bore 41 should be slightly less than the width of the loops 28 so that the loops are a snug fit and are frictionally engaged to the bore.

In some cases, it may be desirable to attach the caps to the strip prior to application to the panel. In these instances, the caps may be applied over the loops and may be affixed thereto if desired by a heating sealing process as noted in FIGURE 4. In this connection, the cap may be formed from a thermoplastic material such as a vinyl resin or polyethylene, etc., and a hot pointed tool may be pressed into the outer cone surface just below the end of the loop so as to force the material when heated inwardly as noted at 50 in FIGURE 4. This causes a portion of the material of the cap to be formed into an indent as shown at 52 whereby the cap is effectively attached to the loop although the material, since it has some degree of resiliency even in the heavy conical section, can be forcibly removed from the loops if desired. Of course, if the heat sealing operation is carried out with sufficient force, it is even possible to seal one side of the bore to the other through the loop to permanently attach the caps, all of such modifications coming fully within the scope of this invention and being matters of choice.

I am aware of caps that have been used in the past in connection with sealing strips of the general character described here and wherein the use of the caps has been proposed for similar reasons. However, it is pointed out that these prior attempts to seal the doors have not been fully successful due to the fact that the material of the caps has been resilient throughout and that flange sealing has not been provided to adequately prevent water from passing in or out the door. Similarly, in the present invention, much of the success thereof may be attributed to the design of the cap wherein the plastic material for forming the caps is relatively hard in the heavy sections such as in the conical section but relatively flexible in the flange sections where very thin sections of material are formed and permanently extend towards one another to aid in their deflection when installed. This permits the cap to be inserted and form a tight seal with the door due to the flexibility of the opposed flange portions thereon while simultaneously offering considerable strength and rigidity to the support of the strip through the heavy section conical portion thereof. Similarly, the relatively hard conical portion of the cap permits easy insertion since the cap may be pressed inwardly until the lip 44 passes the panel whereupon it snaps outwardly and, when the pressure is released, a tight seal is formed at opposite sides of the door.

This type of cap is a marked advance over anything heretofore suggested since it provides a double seal due to the flexible flanges at opposed sides of the cap which holds the seal in water-tight relation to the door. I prefer to use polyethylene having a hardness in the order of 95, durometer reading, for the cap although it is apparent that other materials which are relatively hard in heavy sections and relatively flexible in thin sections may be used and, to this end, a number of rubber compounds formed from either natural or synthetic rubber are well known in the art, the only requirement being that the conical portion of the cap is relatively hard while the thin flange portions thereof are relatively flexible and extend toward one another. It is also pointed out that where heat sealing is desired, the material should be of a thermoplastic nature so that a permanent indent may be obtained by use of a hot indenting tool.

While the embodiments of the present invention as herein disclosed constitute preferred forms, it is to be understood that other forms might be adopted.

What is claimed is as follows:

1. A sealing device for a panel having an aperture therein which is adapted to receive a looped wire on a sealing strip, comprising; a generally conical unitary member made from yieldable material having a blind bore extending inwardly from the base thereof, an outwardly and generally upwardly extending tapered flange surrounding the open end of the bore and having a diameter greater than the normal diameter of the base of said cone, said flange being formed from relatively thin stock so as to be easily deflectable upon assembly of the member to said panel, a second flange surrounding said cone and spaced from the first-mentioned flange and normally extending downwardly and toward the first-mentioned flange, said second flange being formed by an annular groove extending around said cone inwardly and upwardly from the base thereof, whereby said second flange is tapered and readily flexible, the distance between the outer edges of said flanges in a vertical direction being less than the thickness of the panel to which the member is adapted to be mounted whereby said flanges are flexed away from one another during mounting of the member to the panel for forming fluid-tight seals at opposite sides of the panel, said bore including an inwardly extending heat formed indent which extends into the loop portion of said wire fastening device from one side of said cone for interlocking with the wire loop portion when the sealing strip is assembled to the sealing device and panel for holding the sealing strip to the panel.

2. In combination, an apertured metal panel, a sealing device for said panel passing through the aperture therein and sealing the aperture at opposite sides of the panel, said sealing device comprising; a generally conical unitary member made from yieldable material and having a blind bore extending inwardly from the base thereof, an outwardly and generally upwardly extending flange surrounding the upper end of the bore and having a diameter greater than the normal diameter of the base of the cone and greater than the diameter of said aperture, said flange being formed from relatively thin stock and tapering outwardly so as to deflect and seal against one side of said panel, a second flange surrounding said cone and spaced from said first mentioned flange and extending downwardly toward the first mentioned flange and flaring outwardly in sealed relation to the opposite side of said panel, said second flange being formed by an annular groove extending around said cone inwardly and upwardly from the base thereof, the outer edges of said flanges normally being spaced apart a distance less than the thickness of said panel for enhancing the sealing effect of the flanges against the panel for forming a fluid tight connection at opposite sides of the panel between the panel and the fastening device.

References Cited in the file of this patent

FOREIGN PATENTS

| 474,518 | Canada | Feb. 13, 1950 |
| 800,624 | Great Britain | Aug. 27, 1958 |